United States Patent Office 3,682,845
Patented Aug. 8, 1972

3,682,845
POLYURETHANES DERIVED FROM ALKYLENE OXIDE ADDUCTS OF TRIMETHYLOL PHENOLS AND OF POLYMERS THEREOF
Kermit D. Longley, Forest Park, and Carl Bernstein, Deerfield, Ill., assignors to Witco Chemical Corporation, New York, N.Y.
No Drawing. Continuation-in-part of application Ser. No. 648,941, June 26, 1967. This application Oct. 16, 1970, Ser. No. 81,569
Int. Cl. C08g 22/14
U.S. Cl. 260—2.5 AP                  8 Claims

ABSTRACT OF THE DISCLOSURE

Polyurethanes in the form of elastomers, or flexible, semi-rigid and rigid foams, resulting from the interaction of polyisocyanates and alkylene oxide adducts of trimethylol phenol compounds or of dimers, trimers or tetramers of said trimethylol phenol compounds.

This application is a continuation-in-part of application Ser. No. 648,941, filed June. 26, 1967, now abandoned.

This invention relates to the preparation of novel and useful polyurethanes which are derived from the interaction of polyisocyanates and alkylene oxide adducts of trimethylol phenols.

It has heretofore been known to prepare polyurethanes by the interaction of trimethylol phenols (or lower alkyl or alkenyl ethers thereof) with aromatic polyisocyanates, as set forth in U.S. Pat. No. 2,764,566. It has also been known, as shown in U.S. Pat. No. 3,063,964, to prepare polyurethanes by interacting an aromatic polyisocyanate with a polyether polyol in the presence of an amount, smaller than that of the polyether polyol, of a polymethylol phenol as a cross-linking agent, said polymethylol phenol having the formula

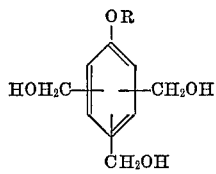

where R is selected from the group consisting of hydrogen, and alkyl and alkenyl groups containing not more than 5 carbon atoms. It has also heretofore been suggested to use certain ethylene oxide or propylene oxide adducts of tetramethylol cyclohexanols in the production of polyurethanes, as shown, for instance, in German Pats. Nos. 1,161,686 and 1,162,070.

The properties and characteristics of polyurethanes utilizing the polymethylol phenols, as described above, have left much to be desired and, so far as we are aware, despite the wide and growing commercial uses of polyurethanes generally, those made with polymethylol phenols have either not been marketed or have made no impress on the market. In the case of the alkylene oxide adducts of the tetramethylol cyclohexanols, the expense thereof is considerable and the restrictions as to the number of functional groups therein are such so that, so far as we are aware, they have come into little, if any, commercial use in the production of polyurethanes.

In accordance with our present invention, novel polyurethanes are produced which have highly desirable properties, which are quite economical to produce, and which lend themselves particularly for use as rigid polyurethane foams as, for instance, in insulation in refrigerators and freezers and other environments, but which are also useful in the production of polyurethane elastomers as well as in the production of flexible polyurethane foams and semi-rigid foams. The polyurethanes of our invention are obtained by reacting, with a polyisocyanate, certain α-epoxide adducts of trimethylol phenol compounds or polymeric methylene condensation products of said trimethylol phenol compounds, to wit, dimers, trimers and tetramers of said trimethylol phenol compounds. The trimethylol phenol compounds, prior to polymerization thereof and/or adduction with the α-epoxides, are represented by the following formula and are shown in the aforementioned U.S. Pat. No. 3,063,964:

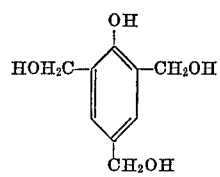

Dimers of said trimethylol phenol compounds can be represented by the following formula

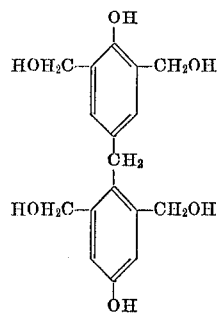

and trimers and tetramers can be represented accordingly.

The adduction or epoxidation of the polymethylol phenol compounds or the dimers, trimers or tetramers of said polymethylol phenol compounds is easily performed by known adduction or epoxidation procedures in an aqueous medium and without preparing an intermediate salt of the polymethylol phenol. In general, those of the α-epoxide adducts which are prepared using propylene oxide as the α-epoxide are soluble in cold water but are insoluble in water at temperatures of about 180 degrees F. and upwards thereof. Hence, by extraction with hot water, lower molecular weight reaction products and other soluble by-products, to the extent that they may be undesirable in any given case, are readily removable.

The adduction or epoxidation of the trimethylol phenol compounds or the dimers, trimers or tetramers thereof, is most advantageously carried out by means of propylene oxide. Other alkylene oxides or α-epoxides can be utilized as, for instance, ethylene oxide, or mixtures of ethylene oxide and propylene oxide, or by reaction first with propylene oxide and then with ethylene oxide, or vice versa; or butylene oxide, hexylene oxide, octylene oxide, styrene oxide, and others such as are disclosed, for instance, in U.S. Patent No. 3,245,924. The quantity of propylene oxide adducted with the trimethylol phenol compounds is variable depending upon the nature of the polyurethane to be produced therefrom, but, in general, for each mol of trimethylol phenol monomer compound, from about 4 to about 14.5 mols, and, better still, from about 4 to about 8 mols of alkylene oxide, particularly propylene oxide or ethylene oxide, is advantageously used. Where the dimers, trimers and tetramers are employed, the following approximate mol ratios are advantageously used for each mol of dimer, trimer or tetramer as the case may be: dimers—6 to 10 mols of propylene oxide or ethylene oxide; trimers—8 to 16 mols of propylene oxide or ethylene oxide; and tetramers—10 to 20 mols of propylene oxide or ethylene oxide. Where mixtures of the trimethylol phenol compound and the dimers, trimers or tetramers are utilized, the mol ratios of the propylene oxide or ethylene oxide, for instance, may be adjusted accordingly.

The alkylene oxide adducts of the trimethylol phenol compounds, or the dimers, trimers or tetramers thereof, can be admixed, or they or their mixtures can be admixed with other polyols or polyol ethers, such as those disclosed, for instance, in U.S. Patents Nos. 2,866,774 and 3,072,582, and such mixtures can be reacted with the polyisocyanates to produce novel and useful polyurethanes.

In the production of the polyurethane elastomers and foams of the persent invention, the alkylene oxide adducts of the trimethylol phenol compound, or the dimers, trimers and tetramers thereof, or the aforesaid mixtures, are reacted with the polyisocyanates utilizing per se known techniques as disclosed, for instance, in various patents such as U.S. Patents Nos. 3,245,924 and 3,265,641. Numerous polyisocyanates can be employed, as shown in said patents, but, in general, it is preferred to use an approximately 80/20 mixture of 2,4- and 2,6-tolylene-diisocyanate, commonly designated as 80/20 TDI. Others are, by way of illustration, 65/35 mixture of 2,4- and 2,6-toluene diisocyanate; diphenylmethane-4,4'-diisocyanate; 4,4'-methylene bis cyclohexyl diisocyanate; isophorone diisocyanate; hexamethylene diisocyanate and polymethylene polyphenylisocyanate (PAPI). Similarly, numerous catalysts, emulsifiers, stabilizers, and foaming systems can be utilized as well as so-called one-shot procedures and procedures via the prepolymer route for the production of the polyurethanes. Reference is made in this regard, for instance, to the aforementioned patents as well as U.S. Patents Nos. 2,949,431; 2,948,691; 3,026,275; 3,036,021; 3,049,513 and 3,078,239.

In the production of polyurethane foams, utilizing the alkylene oxide adducts of the trimethylol phenol compounds, or their dimers, trimers and tetramers, the hydroxyl numbers thereof should, in general, range from about 200 to about 530.

In the reaction between the alkylene oxide adducts of the tirmethylol phenol compounds, or the dimers, trimers or tetramers thereof, and the polyisocyanates, the mol ratio of said polyisocyanate to said adduct will, in general, fall within ther ange of about 1.2 to 1.5 mols of polyisocyanate per mole of adduct. In the usual case, it is desirable to use an amount of polyisocyanate in slight excess, generally about a 10% excess, of that which is equivalent to the theoretical amount required to react with all of the hydroxyl groups in the adduct.

The following examples are illustrative of the practice of the invention, but are not to be construed as in any way limitative thereof since various changes can be made in the light of the guiding principles and teachings disclosed herein. Reference to parts is by weight, and to temperature in degrees centigrade. Examples 1–5, inclusive, disclose the preparation of the alkylene oxide adducts which are useful in the production of polyurethanes, and Examples 6 and 7 show the production of typical polyurethanes utilizing such adducts. It may be observed that the paraformaldehyde utilized in said examples breaks down to formaldehyde in the aqueous media in which it is utilized. The additional examples are described hereafter.

EXAMPLE 1

14.1 g. phenol (0.15 mol)
13.5 g. paraformaldehyde (0.45 mol calculated as formaldehyde)
34.9 g. propylene oxide (0.6 mol)
0.5 g. sodium hydroxide pellets
25 ml. water To a four-neck reactor fitted with a stirrer, thermometer and reflux condenser there are added the phenol, paraformaldehyde, sodium hydroxide and water which mixture is then heated to 90° and maintained at this temperature for 1 hour. It is then cooled to room temperature, the propylene oxide gradually is added, and heating is started gently. Refluxing is then carried out for about 17 hours, the temperature reaching 95°. Neutralization is effected with hydrochloric acid to approximately pH 6. The mixture is then transferred to an evaporating dish and heated for 6 hours under vacuum at 80°. A yield of 62.5 g. of a yellow, viscous liquid is obtained. Analysis shows:

Percent $H_2O$—1.2
Acidity—0.002 meq./g.
Hydroxyl value—11.0 meq./g. as compared with 9.6 meq./g. theoretical for the tetrapopoxylated derivative

EXAMPLE 2

| | G. |
|---|---|
| Phenol (2.39 mols) | 225 |
| Paraformaldehyde (7.20 mols calculated as formaldehyde) | 216 |
| Propylene oxide (9.61 mols) | 558 |
| Distilled water | 386 |
| Sodium hydroxide pellets | 8 |

The phenol, paraformaldehyde and water are admixed, the sodium hydroxide is added and stirred in while heating to 90°, the mixture is maintained at this temperature for 1 hour and then cooled to room temperature, and then half of the calculated propylene oxide is added, the mixture refluxed for 3 hours, cooled and then allowed to stand overnight. The balance of the propylene oxide is then added and the reaction mixture is refluxed for 7 hours. It is then allowed to stand for 48 hours, and then refluxed for 10 more hours, at which point all the propylene oxide has reacted. Dehydration under vacuum is effected. The analysis shows:

Percent $H_2O$—2.7
Alkalinity—0.11 meq./g.
Hydroxyl value—10.1 meq./g.

EXAMPLE 3

To 980 g. of the product of Example 2 there are added 390 g. of propylene oxide to lower the hydroxyl concentration to about 7.1 meq./g., said propylene oxide addition being done as described previously. Analysis shows a hydroxyl concentration of 7.5 meq./g. The material is then neutralized with hydrochloric acid and filtered. Direct molecular weight determination, by the osmometer, shows a molecular weight of 463, giving a functionality of 3.5. The material can be purified, if desired, by treating it first with a strongly basic ion exchange resin and then with a strongly acid ion exchange resin.

EXAMPLE 4

| | Lbs. |
|---|---|
| Phenol (85% in water) | 190 |
| Paraformaldehyde | 155.7 |
| Propylene oxide +250 lbs. | 401.4 |
| Water | 279 |
| Sodium hydroxide flakes | 5.8 |

The manner of preparation is the same as described in Example 2 and, after dehydration, the 250 lbs. of propylene oxide is added to lower the hydroxyl concentration to 7.15 meq./g. The material is then neutralized with hydrochloric acid and washed three times with water, at about 92°. After final dehydration and filtration with a filter aid, the analysis is as follows:

Hydroxyl value—6.7 meq./g.
Acidity—0.09 meq./g.
pH—5.9
Percent $H_2O$—0.04

EXAMPLE 5

| | G. |
|---|---|
| 85% phenol water solution | 265 |
| Paraformaldehyde | 216 |
| Sodium hydroxide | 8 |
| Water | 350 |

416 g. propylene oxide +290 g. to lower the hydroxyl number to 350 g. of water in a 2 l. flask there are added 265 g. of 85% phenol solution and 216 g. paraformaldehyde and the mixture is stirred while adding 8 g. of sodium hydroxide predissolved in water. The mixture is heated to 90° and maintained there for 1 hour. It is then cooled to room temperature and 416 g. propylene oxide is added, with stirring. Refluxing for about 15 hours is then carried out and, when the temperature reaches 100°, without any propylene oxide present, the reaction mixture is heated to 120° under vacuum for 3 hours. Analysis shows a 9.36 meq./g. hydroxyl concentration. The material is very viscous. Then 290 g. of propylene oxide is added dropwise to lower the hydroxyl number to 400 (7.15 meq./g.). The resulting resin is then neutralized with $CO_2$ and washed three times with water. After it is dehydrated and filtered, the hydroxyl number is 384 (6.85 meq./g.) and the molecular weight by the osmometer is 1230. This indicates a largely dimer molecule with a functionality of over 8.

EXAMPLE 6

A polyurethane foam is made from the following formulation by standard foaming procedures:

| | Parts |
|---|---|
| Composition of Example 3 | 100.0 |
| Freon 11 | 20.0 |
| L520 Silicone [1] | 0.5 |
| DMEA (Dimethylethylenediamine) | 1.0 |
| Dabco LV33 [2] (⅓ Dabco in resin) | 0.15 |
| 80/20 TDI | 75.5 |

[1] A polydimethylsiloxane-polyoxyethyleneoxypropylene block copolymer made as described in the procedures of U.S. Patent No. 2,834,748.
[2] 33% solution of triethylenediamine.

Results:
(1) Appearance—Very good
(2) Sag—None
(3) Splits—None
(4) Surface cure—Very rapid

EXAMPLE 7

(a) 50 g. of the composition of Example 3 is added to 287 g. of 80/20 TDI at room temperature and the temperature rises to about 43° at the end of about 33 minutes. Then 50 g. additional of the composition of Example 3 are added at 42 degrees C., the temperature rising to about 69° in 30 minutes. The mixture is then held at 70° for 1 hour.

(b) A polyurethane foam having excellent characteristics is then made using the following formulation:

| | Parts |
|---|---|
| Mixture of part (a) | 105 |
| Composition of Example 3 | 100 |
| DC–113 [1] | 3.0 |
| DMCO,[2] TMBDA [3] | 3.0 |
| Freon 11 | 45.0 |

[1] Silicone 113.
[2] Dimethyl coco amine (distilled grade).
[3] Tetramethylbutane diamine.

It has heretofore been disclosed, as shown in British Patent No. 1,029,033, to prepare polyurethanes by reacting together organic polyisocyanates with polyethers formed by adducting ethylene oxide or propylene oxide with a fusible, organic solvent soluble condensation product of a phenol and an aldehyde containing condensate units having reactive phenolic groups, such as a novolak resin or a resole. The polyurethanes of our present invention are clearly distinguishable from those of said British patent. In this connection, it may be noted that the novolak resins (less than 1 mol of formaldehyde per mol of phenol) are solids or substantially solids when, for instance, sufficient propylene oxide is adducted with them to reduce the hydroxyl value to the usual use level of about 7 to 9 meq./g. (400 to 500 hydroxyl number) and, hence, cannot be formulated to produce polyurethanes by conventional polyurethane formulation procedures. If more propylene oxide is added to reduce the viscosity to a useable range, e.g. 110,000 cps. (which is still undersirably high), the hydroxyl value becomes so low that polyurethane foams produced therefrom have poor compressive strength and resistance to distortion at elevated temperatures. In contrast thereto, polyurethane foams produced in accordance with our invention, derived from the polyethers of trimethylol phenol compounds, are characterized by distinctly superior properties, notably in regard to compressive strengths at elevated temperatures.

In the cases of the resoles (more than 1 mol of formaldehyde per mol of phenol) which are referred to in said British Patent No. 1,029,033, if they are sought to be utilized in the manner described in Example 1 of said patent, the adducts become infusible at a temperature much below that used to dephenolate and dehydrate the resin. Again, polyurethanes made from such resoles after adduction with alkylene oxide posses inferior properties.

The following Exmples 8 and 9 are provided to demonstrate that the resoles behave similarly whether acid or basic catalysts are employed. Example 10 is provided to demonstrate the properties of a polyether derived from a novolak resin and a polyurethane foam produced therefrom. Example 11 shows, contrastingly, the properties of a trimethylol phenol polyether and a polyurethane foam produced therefrom, in accordance with our invention.

EXAMPLE 8

To a stirred reactor are added 165 parts of 85% phenol, 3 parts of a 10% sodium dodecyl benzene sulfonate solution and 1.1 parts of oxalic acid. This mixture is heated to 95° and 182 parts of 37% aqueous formaldehyde (phenol: formaldehyde ratio 1:1.5) added at such a rate that the reaction mixture is kept under gentle reflux. When the addition is complete, heating at reflux is continued for an additional 2 hours. The reactor and its contents are then placed under 25 mm. vacuum and the temperature slowly raised to remove the moisture. At about 125° the material suddenly gelled to a clear yellowish solid. A portion of this material heated to 200° remained infusible.

EXAMPLE 9

This experiment is repeated using 1 gram of sodium hydroxide as catalyst. In this case gelation occurs at about 140°. The product is a dark-red brown solid that remains infusible at 200°.

EXAMPLE 10

(a) A polyol ether is prepared from a novolak resin by placing 705 parts of 85% phenol in a stirred reactor, then adding 2.5 parts of oxalic acid and 10 parts of approximately 10% sodium dodecyl benzene sulfonate. This mixture is heated to 95° and 225 parts of 37% formaldehyde are added at such a rate that a steady reflux is maintained. When formaldehyde addition is completed, the material is maintained at reflux for an additional 2 hours at the end of which period the system is put under vacuum and the temperature slowly raised to 200° to remove water and unreacted phenol, then cooled to 150° and 5 parts of a 30% solution of sodium hydroxide are added. The system is again put under vacuum to remove the moisture. On cooling, 415 parts of glassy solid is obtained. This product is reheated to 150° and 205 parts of propylene oxide added (approximately 0.92 mol per mol of phenol) and heating continued until it is all reacted. The product obtained is 615 parts of a glassy solid. The reaction is continued and 300 parts additional propylene oxide are added. 910 parts of a viscous liquid are obtained. After treatment with ion exchange resin to remove the basic catalyst, the product has a viscosity of 110,000 cps. at 24° and a hydroxyl value of 4.58 meq./g. (hydroxyl number of 257).

(b) A polyurethane foam is prepared from the novolak polyol ether of part (a) of this Example 10 by mixing 100 parts thereof with 240 parts of tolylene diisocyanate, under a blanket of nitrogen, warmed to 70° and maintained at this temperature for 5 hours. The resulting prepolymer contains 28.5% free NCO groups. A catalyst premix is prepared by stirring together 100 parts of the polyol with 2 parts of tetramethyl butanediamine, 1 part of silicone surfactant, and 0.4 part of stannous octoate. Then to 50 parts of the prepolymer are added 75 parts of the catalyst premix and 28 parts of fluoro trichloro methane (Freon 11). A fine-celled, rigid, but rather soft foam is obtained.

EXAMPLE 11

(a) A trimethylol phenol type of polyol ether is initially prepared by adding to 554 parts of 85% phenol in a stirred reactor 900 parts of 50% aqueous formaldehyde and the mixture is heated to 90°, 20 parts of NaOH dissolved in 40 parts of water being added in portions over a period of about 15 minutes. The reaction is strongly exothermic and is maintained at 90° by cooling or heating as required for a period of 1½ hours. At the end of this period, the reaction mixture is cooled rapidly to 60° and 560 parts of propylene oxide are added over a period of 5 hours at this temperature. At the end of this addition, all phenolic hydroxyls are converted to the hydroxy propyl ether and the product is no longer readily polymerized by alkaline catalysts. An additional 10 parts of sodium hydroxide is added to the reaction mixture and the system put under vacuum and heated to 125° to remove the moisture. When the moisture is reduced to less than 0.1%, an additional 980 parts of propylene oxide are then added over a period of about 6 hours at this temperature. The product is then stripped under vacuum, cooled and treated with ion exchange resin to remove the base. Recovery is 2385 parts of a dark amber oil with a viscosity of 25,000 cps. at 24° and a hydroxyl value of 7.28 meq./g. (hydroxyl number of 408).

(b) A polyurethane is prepared from the trimethylol phenol polyol ether of part (a) of this Example 11 in the manner described in part (b) of Example 10.

The following table shows various properties of the polyurethane foams formed in part (b) of Example 10 and part (b) of Example 11 after aging said foams for two weeks.

(a) In a stirred reactor was placed 2650 parts of 37% formaldehyde and 1205 parts of 85% phenol, the contents of the reactor was heated to 90°, and to it was added 30 parts of 50% potassium hydroxide over a period of about ½ hour. This addition was made at such a rate that the temperature could be controlled at 90°. When the catalyst addition was complete, the reaction mixture was maintained at this temperature for an additional hour. At the end of this period the contents of the reactor was cooled rapidly to 60°, and to it was added 1265 parts of propylene oxide over a period of about 5 hours at this temperature, and the reaction was continued until the phenol groups were all converted to hydroxypropyl ether groups as evidenced by a sudden increase of the pH of the reaction mixture.

The reactor was then put under vacuum and the temperature raised to 125° and maintained at this temperature until the moisture content was less than 0.1%. An additional 80 parts of 50% potassium hydroxide solution was then added and 2140 parts of propylene oxide added over a period of about 10 hours, at this temperature. When the propylene oxide had reacted the product was stripped and treated with ion exchange resin to remove the catalyst. 5000 parts of an amber oil was obtained with a viscosity of 8000 cps. and a hydroxyl value of 7.31 meq./g. (hydroxyl number 410).

(b) This polyol was then formulated as follows:

|  | Parts |
| --- | --- |
| Polyol | 100 |
| Tetramethyl butanediamine | 1.0 |
| Stannous octoate | 0.3 |
| Dabco 33LV (triethylene diamine 33%) | 1.0 |
| DC201 (silicone surfactant) | 1.0 |
| Freon 11 | 31 |
| PAPI (polymethylene polyphenylisocyanate) | 102 |

The first 6 ingredients were stirred together and the isocyanate then added with continued stirring. The product is a fine celled rigid foam with a density of 2.0 pounds per cubic foot.

What is claimed is:

1. A polyurethane derived from the reaction of a polyisocyanate and a liquid polyether in the form of an alkylene oxide adduct of at least one member selected from the group of trimethylol phenol compounds, and their dimers, trimers and tetramers, said trimethylol phenol

| | Polyol properties | | Foam properties | | |
| --- | --- | --- | --- | --- | --- |
| Polyol | Hydroxyl value, meq./g. | Viscosity, cps. at 24° C. | Density, lbs./cu. ft. | Compressive strength, lbs./sq. in. | Softening point, ° C. |
| Novolak derived polyol Ex. 3(b) | 4.58 | 110,000 | 2.05 | 18.2 | 45 |
| Trimethylol phenol polyol Ex. 4(b) | 7.28 | 25,000 | 1.91 | 40.0 | 105 |

These data indicate that when the viscosity of the novolak polyol ether is reduced to the point that it can be handled (a viscosity of 110,000 cps.—but still very difficult to handle conveniently) by the addition of an epoxide, the hydroxyl value is so low that inferior rigid foams are obtained. On the other hand, because of the very high initial hydroxyl concentration of the trimethylol phenol polyol ethers, when the viscosity is reduced to the useable range by the addition of an epoxide, the hydroxyl value is still high enough that very satisfactory rigid foams can be prepared.

EXAMPLE 12

This example indicates the preparation of a low viscosity polyol and the preparation of a rigid foam from this polyol using a polymeric isocyanate.

compounds, prior to adduction or dimerization, trimerization or tetramerization, having a formula

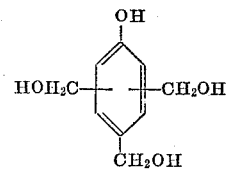

2. A polyurethane according to claim 1, wherein the polyisocyanate is tolylene diisocyanate.

3. A polyurethane according to claim 1, wherein the alkylene oxide is one or both of the group ethylene oxide and propylene oxide.

4. A polyurethane according to claim 1, wherein the alkylene oxide is selected from the group of ethylene oxide and propylene oxide, and the hydroxyl number of the polyether is in the range of about 200 to about 530.

5. A polyurethane according to claim 1, in which the specified polyester is admixed with a polypropylene ether of an aliphatic di- or polyhydric alcohol prior to reaction with the polyisocyanate.

6. A polyurethane according to claim 1, in the form of a foam, the reaction being carried out in the presence of a blowing agent.

7. A polyurethane according to claim 6, in which the alkylene oxide is propylene oxide, in which the polyisocyanate is tolylene diisocyanate, and in which the hydroxyl number of the polyether is in the range of about 200 to about 530.

8. A polyurethane according to claim 3, wherein, for each mol of trimethylol phenol compound employed, the following number of mols of said alkylene oxide is present in said adduct:

|  | Alkylene oxide |
|---|---|
| (a) Trimethylol phenol monomer | 4–14.5 |
| (b) Trimethylol phenol dimer | 6–10 |
| (c) Trimethylol phenol trimer | 8–16 |
| (d) Trimethylol phenol tetramer | 10–20 |

References Cited

UNITED STATES PATENTS

| 3,470,118 | 9/1969 | Forster | 260—77.5 AP |
| 3,497,465 | 2/1970 | Kujawa | 260—77.5 AP |
| 2,579,329 | 12/1951 | Martin | 260—613 B |

FOREIGN PATENTS

| 1,029,033 | 5/1966 | Great Britain. |

DONALD E. CZAJA, Primary Examiner

M. J. WELSH, Assistant Examiner

U.S. Cl. X.R.

260—47 CB, 77.5 AP

UNITED STATES PATENT OFFICE
CERTIFICATE OF CORRECTION

Patent No. 3,682,845          Dated August 8, 1974

Inventor(s) Kermit D. Longley and Carl Bernstein

It is certified that error appears in the above-identified patent and that said Letters Patent are hereby corrected as shown below:

Column 2, lines 22-34, for the formula:

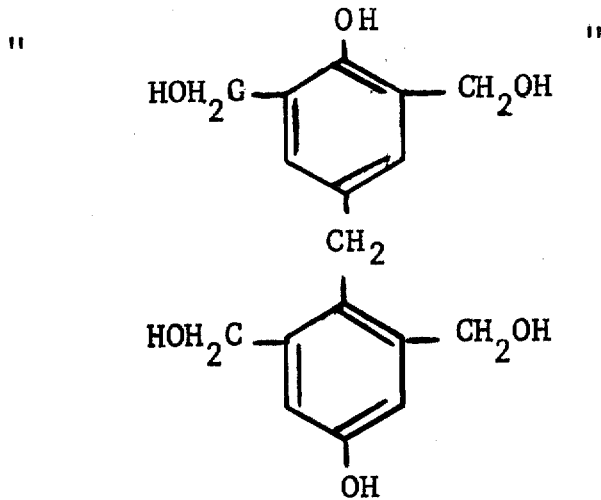

read:

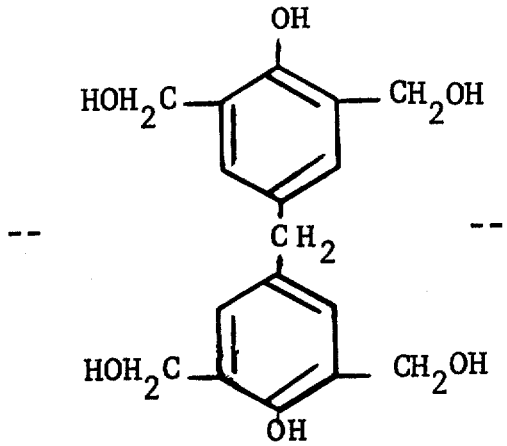

Signed and sealed this 8th day of October 1974.

(SEAL)
Attest:

McCOY M. GIBSON JR.
Attesting Officer

C. MARSHALL DANN
Commissioner of Patents